United States Patent [19]

Isiguro

[11] Patent Number: 5,456,852
[45] Date of Patent: Oct. 10, 1995

[54] MICROCAPSULE FOR HEAT-STORING MATERIAL

[75] Inventor: Mamoru Isiguro, Tokyo, Japan

[73] Assignee: Mitsubishi Paper Mills Limited, Japan

[21] Appl. No.: 57,487

[22] Filed: May 6, 1993

[51] Int. Cl.⁶ ............................. B01J 13/18; C09K 3/18
[52] U.S. Cl. ................. 252/70; 165/10; 252/67; 428/402.2; 428/402.21; 428/402.24
[58] Field of Search ............... 428/402.2, 402.21, 428/402.24; 252/67, 70; 165/10 R, 10 A

[56] References Cited

U.S. PATENT DOCUMENTS

| 3,951,127 | 4/1976 | Watson et al. | 252/70 X |
|---|---|---|---|
| 4,100,092 | 7/1978 | Spauschus et al. | 252/70 |
| 4,504,402 | 3/1985 | Chen et al. | 252/70 |
| 4,588,640 | 5/1986 | Matlach | 428/402.21 X |
| 4,708,812 | 11/1987 | Hatfield | 252/70 |
| 4,732,810 | 3/1988 | Kito et al. | 428/402.2 |
| 4,747,240 | 5/1988 | Voisinet et al. | 252/70 X |
| 4,882,259 | 11/1989 | O'Connor et al. | 428/402.21 X |
| 4,931,333 | 6/1990 | Henry | 428/402.2 X |
| 5,007,478 | 5/1981 | Sengupta | 165/10 |

FOREIGN PATENT DOCUMENTS

| 0022717 | 1/1981 | European Pat. Off. | 252/70 |
|---|---|---|---|
| 2142135 | 1/1985 | United Kingdom . | |

OTHER PUBLICATIONS

Database WPI, Week 9208, Derwent Publications Ltd., London, GB; AN 92-061616 (1992).

*Primary Examiner*—Richard D. Lovering
*Attorney, Agent, or Firm*—Cushman Darby & Cushman

[57] ABSTRACT

A microcapsule for heat-storing material which encapsulates a compound capable of undergoing phase transitions, said microcapsule containing a high-melting compound having a melting point 20°–110° C. higher than that of the compound capable of undergoing phase transitions.

5 Claims, No Drawings

MICROCAPSULE FOR HEAT-STORING MATERIAL

BACKGROUND OF THE INVENTION

1. Field of the Invention

The present invention relates to a microcapsule for heat-storing material which is used for cooling or heating a substance or for maintaining a substance at a constant temperature. More particularly, the present invention relates to a microcapsule for heat-storing material which has a good fluidity under any temperature condition and a high stability over an extensive period of time, and can retain latent heat at a high density. The microcapsule for heat-storing material of the present. invention can be utilized as a heating and cooling medium for air conditioning, or it can be utilized as a portable high-temperature insulation material or low-temperature insulation material by holding in any of various packaging materials and containers.

2. Related Art

A heat-storing material most generally used every day is water. Water is used for high-temperature or low-temperature insulation usually in the form of hot water or ice and can be said to be the most inexpensive heat-storing material in daily life.

In general, as compared with a method utilizing only sensible heat which does not accompany the phase transitions of a substance, a method of heat storage by utilization of latent heat accompanying the phase transitions has the following advantage. In this method, since a large quantity of thermal energy can be stored at a high density in a narrow temperature range including the melting point, the volume of a heat-storing material can be reduced, and moreover the heat loss can be kept small because no large temperature difference develops, considering the large quantity of heat stored.

As a heat-storing material in which there is utilized latent heat accompanying phase transitions, in particular, phase transitions between liquid and solid, any heat-storing material can be used so long as it has a melting point or freezing point. There is preferably used a heat-storing material which is physicochemically stable and absorbs heat of fusion of 20 kcal/kg or more in practical application. The following materials are generally known as typical heat-storing materials.

(1) Inorganic compounds containing a large amount of water of crystallization, for example, calcium chloride hexahydrate, sodium sulfate decahydrate, sodium hydrogenphosphate dodecahydrate, sodium thiosulfate pentahydrate, and nickel nitrate hexahydrate.

(2) Organic compounds, for example, aliphatic hydrocarbons such as tetradecane, pentadecane, cyclohexane, etc.; aromatic hydrocarbons such as benzene, naphthalene, etc.; fatty acids such as lauric acid, stearic acid, etc.; alcohols such as lauryl alcohol, stearyl alcohol; and ester compounds such as methyl stearate, methyl cinnamate, etc.

For increasing the heat exchange efficiency of these various heat-storing materials, there have been proposed means for encapsulating the heat-storing materials in microcapsules [for example, Jap. Pat. Appln. Kokai (Laid-Open) Nos. SHO 62 (1987)-1452, SHO 62 (1987)-45680, SHO 62 (1987)-149334, SHO 62 (1987)-225241, SHO 63 (1988)-115718, SHO 63 (1988)-217196, and HEI 2 (1990)-258052].

All of the methods for encapsulation in microcapsules disclosed in the above references are capsulation methods in which water or any of the inorganic compounds belonging to the above group (1) is encapsulated in microcapsules. Also in the case of the organic compounds belonging to the group (2), i.e., the organic compounds which undergo phase transitions, namely, which have a melting point, the employment of a conventional capsulation method permits production of an oil-in-water type microcapsule dispersion which is seemingly rich in capsule solidness and fluidity.

When there was produced an oil-in-water type dispersion of microcapsules encapsulating the aforesaid organic compound capable of undergoing phase transitions and a heat-storing operation was carried out, the following problem was found to be caused. The dispersion of microcapsules encapsulating the compound capable of undergoing phase transitions which is usable in the present invention, repeats heat absorption or heat dissipation on heating or cooling, respectively, and can be used for various purposes. It was found that in this case, there is caused a phenomenon that the melting point and freezing point of the compound capable of undergoing phase transitions which has been encapsulated in the microcapsules are different from each other, namely, a remarkable supercooling phenomenon.

It is known that the supercooling phenomenon is usually caused in greater or lesser degree when a compound capable of undergoing phase transitions is cooled to fall into a solid state. In the case of a microcapsule encapsulating the compound capable of undergoing phase transitions, like the microcapsule of the present invention, the supercooling phenomenon is markedly accelerated, so that high energy has been necessary for the phase transitions.

In general, as a method for preventing the supercooling phenomenon, there are known a method using a nucleating agent such as metal powder or clay powder, and a mechanical method in which agitation, slight vibration, application of an electric shock, or the like is carried out. When either of these methods is applied to the microcapsule of the present invention, the former method is disadvantageous in that the encapsulation of the powder in the microcapsule results in the deterioration of wall of the microcapsule and the restriction of particle size of the microcapsule by the particle size of the powder. The latter method, i.e., the mechanical method is hardly effective probably because the compound capable of undergoing phase transitions is completely segregated from the outside of the microcapsule.

OBJECT AND SUMMARY OF THE INVENTION

An object of the present invention is to provide a microcapsule for heat-storing material which encapsulates a compound capable of undergoing phase transitions and in which the supercooling phenomenon of the compound capable of undergoing phase transitions is prevented, namely, the difference between the melting point and freezing point of the compound is very small when heating and cooling are conducted.

The present inventor investigated for achieving the above object and consequently made it possible to obtain a microcapsule for heat-storing material which contains a compound capable of undergoing phase transitions and a compound having a melting point higher than that of the compound capable undergoing phase transitions (hereinafter referred to as "high-melting compound"), and in which the supercooling of the compound capable of undergoing phase transitions is prevented by the presence of the high-melting compound, namely, the difference between the melting point and freezing point of the compound becomes very small, when heating and cooling are conducted, due to the presence of the high-melting compound. Thus, the present invention has been accomplished. That is, the present invention provides a microcapsule for heat-storing material which encapsulates a compound capable of undergoing phase transitions, said microcapsule containing a high-melting compound having a melting point 20°–110° C. higher than that of the compound capable of undergoing phase transitions. Said microcapsule is explained below in detail.

DETAILED DESCRIPTION OF PREFERRED EMBODIMENTS

As the high-melting compound used in the present invention, a compound having a melting point 20°–110° C., preferably 30°–100° C. higher than that of the compound capable of undergoing phase transitions is suitable. A compound having a melting point below the above temperature range is not preferable because the supercooling phenomenon cannot be sufficiently prevented. A compound having a melting point beyond the above range is also not preferable because for example, when the temperature drops to some extent in a capsulation step, such a compound separates out because of its insufficient miscibility with the compound capable of undergoing phase transitions. As to the content of the high-melting compound, this compound is contained in an amount of 0.5 to 40 (wt/wt) %, preferably 1 to 35 (wt/wt) %, relative to the amount of the compound capable of undergoing phase transitions. When the content is below the above content range, the effect of the present invention is not sufficient. When the content is beyond the above content range, an undesirable influence on capsule wall formation reaction is brought about, and the quantity of heat stored is decreased in proportion to the decrease of the proportion of the compound capable of undergoing phase transitions. Therefore, both of such contents are not desirable.

As the compound capable of undergoing phase transitions which is used in the present invention, any compound can be used so long as it has a melting point or a freezing point. Specifically, there can be used the above-exemplified inorganic compounds containing a large amount of water of crystallization and organic compounds such as aliphatic hydrocarbons, aromatic hydrocarbons, alcohols, fatty acids, ester compounds, etc. Preferable examples of the compound capable of undergoing phase transitions are straight-chain aliphatic hydrocarbons having 10 or more carbon atoms, such as tetradecane, pentadecane, hexadecane, eicosane, docosane, etc,; and ester compounds such as alkyl myristate, alkyl palmitate, alkyl stearate, etc. These compounds capable of undergoing phase transitions may be used as a mixture of two or more thereof for producing a heat-storing material having a melting point fit for a purpose.

Specific examples of the high-melting compound used in the present invention are aliphatic hydrocarbon compounds, aromatic compounds, esters (including fats and oils), fatty acids, alcohols and amides. When the compound capable of undergoing phase transitions, i.e., the heat-storing material is a nonpolar compound such as an aliphatic hydrocarbon or an aromatic hydrocarbon, preferable examples of the high-melting compound are fatty acids, alcohols and amides which have a higher polarity than does the nonpolar compound. For example, when tetradecane (m.p. 6° C.) is used as the compound capable of undergoing phase transitions, specific examples of the high-melting compound are cetyl alcohol, stearyl alcohol, eicosanol, myristic acid, palmitic acid, behenic acid, stearic acid amide, ethylenebisoleic acid amide, methylolbehenic acid amide and N-phenyl-N'-stearylurea. These compounds may be used singly or in combination of two or more thereof.

A compound capable of undergoing phase transitions and a high-melting compound are subjected to capsulation by a suitable method for encapsulation in microcapsules. As a method for encapsulating a liquid nonmiscible with water in microcapsules, there can be employed, for example, a coacervation method using gelatin and an anionic macromolecule, an interfacial polymerization method, an in-situ method and a method using yeast (Jap. Pat. Appln. Kokai (Laid-Open) No. SHO 63 (1988)-88033, etc.). For the use of the capsulation product as a heat-storing material for a long period of time, the microcapsules are required to have a good physical durability during a thermal cycling from a low temperature region to a high temperature region and a high chemical stability to the compound capable of undergoing phase transitions and a medium for cooling or heating. For satisfying this requirement, it is most preferable to use microcapsules each composed of a membrane of an aminoplast resin which are formed by an in-situ method.

The aminoplast resin is a resin obtained by polymerization reaction of an amino compound with formaldehyde. Specific examples of the aminoplast resin are urea-formaldehyde resins, melamine-formaldehyde resins and benzoguanamine-formaldehyde resins. The melamine-formaldehyde resins are the most preferable as the aminoplast resin.

Encapsulation in microcapsules by the use of any of the above aminoplast resins can be carried out usually by the following procedure.

1. A step of preparing an aminoplast resin precondensate.

2. A step of emulsifying and dispersing the compound capable of undergoing phase transitions and the high-melting compound in an aqueous dispersant solution.

3. A step of adding the precondensate prepared in the step 1 to the emulsion prepared in the step 2, and then stirring the resulting mixture with heating to form a membrane around each particle of a mixture of the compound capable of undergoing phase transitions and the high-melting compound.

A specific example of process for the preparation of the aminoplast resin precondensate in the step 1 is given below by taking the case where a melamine resin is used. A water-soluble melamine-formaldehyde precondensate can be obtained by mixing melamine powder and formalin (a 37% aqueous formaldehyde solution) in a molar ratio of 1:1 to 1:4 and heating the mixture at about 60° C. or higher under weakly alkaline conditions.

The amount of the aminoplast resin added is approximately 1–30 (wt/wt) %, preferably 5–20 (wt/wt) %, relative to the compound capable of undergoing phase transitions. When the amount is below the above range, the strength of the microcapsules is not sufficient. When the amount is beyond the above range, the content of the membrane material in a coldness-storing material becomes too high, so that the efficiency of heat storage is decreased. Therefore, both of such amounts are not desirable.

Specific examples of the dispersant used in the step 2 are acrylic acid copolymers, ethylene-maleic anhydride copolymers, methyl vinyl ether-maleic anhydride copolymers, styrene-maleic anhydride copolymers, butadiene-maleic anhydride copolymers, vinyl acetatemaleic anhydride copolymers, and sodium salts thereof. These dispersants are added in an amount of 1.0 to 20.0 (wt/wt) % relative to the aqueous dispersant solution.

The pH of the aqueous dispersant solution is adjusted to a pH at which the membrane formation reaction of the aminoplast resin proceeds most efficiently. Usually, the pH is adjusted to an acidic pH of 2 to 7, preferably 3 to 6.

The step of emulsifying the compound capable of undergoing phase transitions and the high-melting compound is carried out by adding said two compounds to the aqueous dispersant solution, and stirring the resulting mixture by means of a commercially available emulsifying and dispersing apparatus or the like until the particle size of emulsified particles becomes approximately 1–50 μm, preferably 1–5 μm.

Subsequently, the previously prepared aminoplast resin precondensate is mixed with the emulsion of the compound capable of undergoing phase transitions and the high-melting compound, and the resulting mixture is stirred with heating to polymerize the precondensate around the emulsified particles, whereby a water-insoluble resin is produced. Thus, microcapsules encapsulating said two compounds are obtained. The temperature at heating in the capsulation is 40°–100° C., preferably 60°–80° C. The stirring is conducted in the above temperature range for 30 minutes to 4 hours.

Although the thus obtained dispersion of the microcapsules encapsulating the compound capable of undergoing phase transitions and the high-melting compound can achieve the object of the present invention as it is, there is, if necessary, obtained a desired heat-storing material in the form of an aqueous liquid by adding ethylene glycol, propylene glycol, various inorganic salts, antiseptics, various stabilizers, thickeners, colorants, dispersion assistants, specific gravity adjustors, wetting agents, etc.

The higher the content of the microcapsules in the heat-storing material, the larger the quantity of latent heat. Therefore, the higher the content becomes, the more preferable it is. For maintaining a good fluidity, it is preferable to adjust the content to 20 to 70 (wt/wt) %, preferably 40 to 60 (wt/wt) %. When the content is beyond the above range, the heat-storing material is increased in viscosity and hence becomes poor in fluidity. The content is below the above range, the heat-storing material is poor in coldness-storing effect. Therefore, both of such contents are not desirable.

The present invention is illustrated in detail with the following examples, which should not be construed as limiting the scope of. the invention. The melting point, freezing point and heat of fusion described in the examples were measured by means of a differential calorimeter (Model DSC-7, mfd. by Perkin Elmer Corp., U.S.A.).

EXAMPLE 1

To 5 g of melamine powder were added 6.5 g of a 37% aqueous formaldehyde solution and 10 g of water, and the resulting mixture was adjusted to pH 8 and then heated to about 70° C. to obtain an aqueous melamine-formaldehyde precondensate solution.

In 100 g of a 5% aqueous solution of sodium salt of a styrene-maleic anhydride copolymer which had been adjusted to pH 4.5 were dissolved 76 g of n-tetradecane (m.p. about 6° C., heat of fusion 50.8 kcal/kg) as compound capable of undergoing phase transitions and 4 g of stearyl alcohol (m.p. 58° C.) as high-melting compound. The resulting mixed Solution was added to the same aqueous sodium salt solution as above with vigorous stirring and emulsification was carried out until the particle size became 2.6 μm.

The whole of the aforesaid aqueous melamine-formaldehyde precondensate solution was added to the resulting emulsion and stirred at 70° C. for 2 hours. Then, the pH of the resulting mixture was adjusted to 9 to terminate the capsulation. A rigid-polyethylene bag was packed with a mixture of 100 parts of the thus obtained microcapsule dispersion and 30 parts of ethylene glycol to obtain a portable coldness-storing material. When the coldness-storing material was allowed to stand in a household freezer for about 1 hour, the coldness-storing material was not solidified and its coldness-storing effect lasted for a long period of time.

EXAMPLE 2

Capsulation was carried out in the same manner as in Example 1 except for using a mixed solution obtained by dissolving at about 90° C., 79 g of n-eicosane (m.p. 37° C., heat of fusion 59 kcal/kg) as compound capable of undergoing phase transitions, in place of tetradecane and 1 g of behenic acid (m.p. about 77° C.) as high-melting compound. The microcapsule dispersion thus obtained was packed into a rigid-polyethylene bag to obtain a portable high-temperature insulation material.

EXAMPLE 3

Capsulation was carried out in the same manner as in Example 1 except for using a mixed solution obtained by dissolving 60 g of n-pentadecane (m.p. 9° C., heat of fusion 38 kcal/kg) as compound capable of undergoing phase transitions, in place of tetradecane and 20 g of stearic acid amide (m.p. about 100° C.) as high-melting compound. The microcapsule dispersion thus obtained was packed into a rigid-polyethylene bag to obtain a portable low-temperature insulation material.

Comparative Example 1

Capsulation was carried out in the same manner as in Example 1, except that 80 g of tetradecane was used alone.

Comparative Example 2

Capsulation was carried out in the same manner as in Example 1 except for using a mixed solution obtained by dissolving 76 g of tetradecane, i.e., the same compound as used in Example 1 and 4 g of lauryl alcohol (m.p. 24° C.) as high-melting compound.

Comparative Example 3

Capsulation was carried out in the same manner as in Example 1 except for using a mixed solution obtained by dissolving 76 g of tetradecane, i.e., the same compound as used in Example 1 and 4 g of ethylene-bisoleic acid amide (m.p. 118° C.) as high-melting compound. Consequently, a large portion of the ethylene-bisoleic acid amide separated out on the surface of the resulting microcapsule dispersion. Thus, the high-melting compound could not be encapsulated in microcapsules.

In Table 1, the degree of supercooling of the microcapsules obtained in Examples 1 to 6 and Comparative Examples 1 to 3 is expressed in terms of the difference (ΔT) between the melting point and the freezing point measured by means of a differential calorimeter. The smaller ΔT value means the lower degree of supercooling.

TABLE 1

| | Compound capable of undergoing phase transitions | Melting point °C. | High-melting compound | Content* % | Melting point °C. | ΔT |
|---|---|---|---|---|---|---|
| Example 1 | Tetradecane | 6 | Stearyl alcohol | 5.3 | 58 | 1.8 |
| Example 2 | Eicosane | 37 | Behenic acid | 1.3 | 77 | 2.5 |
| Example 3 | Pentadecane | 9 | Stearic acid amide | 33.3 | 100 | 2.8 |
| Example 4 | n-Hexadecane Methyl myristate | 11 | Lauric acid amide | 1.0 | 84 | 4.9 |
| Example 5 | Methyl palmitate n-Hexadecane | 15 | Lauric acid amide | 1.0 | 84 | 2.6 |
| Example 6 | Undecanol n-Hexadecane | 10 | Lauric acid amide | 1.0 | 84 | 4.8 |
| Comparative Example 1 | Tetradecane | 6 | None | — | — | 25 |
| Comparative Example 2 | Tetradecane | 6 | Lauryl alcohol | 5.3 | 24 | 16 |
| Comparative Example 3 | Tetradecane | 6 | Ethylenebisoleic acid amide | 5.3 | 118 | 21 |

*Note: The content is given in (wt/wt) percents, relative to the amount?of the compound capable of undergoing phase transitions.

EXAMPLE 4

Capsulation was carried out in the same manner as in Example 1 except for using a mixed solution (ΔT= 4.9° C.) obtained by dissolving at 90° C. a mixture (m.p. 1° C., heat of fusion 38kcal/kg) of 50 g of methyl myristate (m.p. 18° C.) and 50 g of n-hexadecane (m.p. 18° C.), as compound capable of undergoing phase transitions, in place of tetradecane and 1 g of lauric acid amide (m.p. about 84° C.) as high-melting compound. A desirable result was obtained as in Example 1.

EXAMPLE 5

Capsulation was carried out in the same manner as in Example 1 except for using a mixed solution (ΔT= 2.6° C.) obtained by dissolving at 90° C. a mixture (m.p. 15° C., heat of fusion 28 kcal/kg) of 50 g of methyl palmitate (m.p. 28° C.) and 50 g of n-hexadecane (m.p. 18° C.), as compound capable of undergoing phase transitions, in place of tetradecane and 1 g of lauric acid amide (m.p. about 84° C.) as high-melting compound. A desirable result was obtained as in Example 1.

EXAMPLE 6

Capsulation was carried out in the same manner as in Example 1 except for using a mixed solution (ΔT= 4.8° C.) obtained by dissolving at 90° C. a mixture (m.p. 10° C., heat of fusion 40 kcal/kg) of 50 g of undecanol (m.p. about 16.5° C.) and 50 g of n-hexadecane (m.p. 18° C.), as compound capable of undergoing phase transitions, in place of tetradecane and 1 g of lauric acid amide (m.p. about 84° C.) as high-melting compound. A desirable result was obtained as in Example 1.

In the examples, the ΔT values shown in Table 1 indicate the degree of supercooling of microcapsules encapsulating each compound capable of undergoing phase transitions. It is clear that the degree of supercooling of the microcapsule obtained by the use of a mixture of the compound capable of undergoing phase transitions and a high-melting compound is lower than that of the microcapsule containing no high-melting compound. In the case of the microcapsule obtained by the use of a high-melting compound having too high a melting point, a large portion of this compound separated out in the capsulation step and could not be encapsulated in the microcapsule.

What is claimed is:

1. A microcapsule for heat-storing material which encapsulates a compound capable of undergoing phase transitions and being selected from the group consisting of straight-chain aliphatic hydrocarbons having 10 or more carbon atoms, alkyl myristates, alkyl palmitate, alkyl stearate, and mixtures thereof, and a high-melting compound selected from the group consisting of fatty acids, alcohols, amides and mixtures thereof; said high-melting compound having a melting point 20°–110° C. higher than that of said compound capable of undergoing phase transitions.

2. The microcapsule for heat-storing material according to claim 1, wherein the amount of the high-melting compound encapsulated in the microcapsule is 0.5 to 30 weight by weight percents relative to the amount of the compound capable of undergoing phase transitions.

3. The microcapsule for heat-storing material according to claim 1, wherein said compound capable of undergoing phase transitions is selected from the group consisting of tetradecane, pentadecane, hexadecane, eicosane and docosane.

4. The microcapsule for heating-storing material according to claim 1, wherein said high-melting compound is selected from the group consisting of cetyl alcohol, stearyl alcohol, eicosanol, myristic acid, palmitic acid, behenic acid, stearic acid amide, ethylenebisoleic acid amide, methylolbehenic acid amide and N-phenyl-N'-stearylurea.

5. The microcapsule of claim 1 which is obtained by using an aminoplast resin as a material for the wall of the microcapsule.

* * * * *